(12) United States Patent
Findley (10) Patent No.: US 6,851,734 B2
(45) Date of Patent: Feb. 8, 2005

(54) DROP-DOWN, LATERALLY EXPANDING, STRESSED STRUCTURE TRAILER

(76) Inventor: Ben Steven Findley, 9451 Scott River Rd., Fort Jones, CA (US) 96032

(*) Notice: Subject to any disclaimer, the term of this patent is extended or adjusted under 35 U.S.C. 154(b) by 67 days.

(21) Appl. No.: 10/365,662

(22) Filed: Feb. 11, 2003

(65) Prior Publication Data

US 2003/0213185 A1 Nov. 20, 2003

Related U.S. Application Data

(60) Provisional application No. 60/357,490, filed on Feb. 14, 2002.

(51) Int. Cl.[7] .................................................. B60P 3/35
(52) U.S. Cl. ..................................... 296/26.13; 296/171
(58) Field of Search ................................. 296/165, 171, 296/173, 175, 26.09, 26.13; 280/405.1, 426.2, 407, 407.1, 425.2

(56) References Cited

U.S. PATENT DOCUMENTS

| | | | | |
|---|---|---|---|---|
| 2,898,145 A | * | 8/1959 | Ferrera | ....................... 296/171 |
| 3,234,696 A | | 2/1966 | Spencer | |
| 3,719,386 A | | 3/1973 | Puckett | |
| 3,740,088 A | * | 6/1973 | Ratcliff | ....................... 296/171 |
| 4,856,805 A | * | 8/1989 | Davis | ...................... 280/491.4 |
| 5,863,049 A | * | 1/1999 | Mahvi | ...................... 280/6.152 |
| 5,887,880 A | * | 3/1999 | Mullican et al. | .......... 280/43.18 |
| 5,921,033 A | * | 7/1999 | Molina | ......................... 296/171 |
| 6,325,437 B2 | * | 12/2001 | Hiebert et al. | .............. 296/165 |
| 2003/0127827 A1 | * | 7/2003 | Hulsey et al. | ............ 280/491.3 |

* cited by examiner

Primary Examiner—Jason Morrow (57) ABSTRACT

A drop down for floor access, laterally expanding for space, stressed structure for finesse, trailer or portable building that consists of two telescoping open span box shells of space tube type construction with a novel suspension attached both near the floor and near the ceiling that allows walk through floor space between the wheels when the thin trailer floor is sitting on roadway surface in the drop down mode. A "glide-over" box shell section travels on overhead "drawer-slide"apparatus during extensions-retraction and twin overhead "T" beams captivate a combination double foam weather seal and travel stop during extension.

1 Claim, 9 Drawing Sheets

DROP-DOWN, LATERALLY EXPANDING, STRESSED STRUCTURE TRAILER

CROSS-REFERENCE TO RELATED APPLICATION

This application claims the benefit of Provisional patent application Ser. No. 60/357,490 filed 2002 Feb. 14.

BACKGROUND OF THE INVENTION (1) Field of the invention

This invention relates generally to "on-site," service, support, or recreational, "travel" trailers. More specifically to trailers that "drop-down" for more convenient access to the floor surface level, "expand laterally," for a wider more spacious "feel" (while doubling the usable floor space area), and offer a high level of protection and structural strength by way of a well stressed coherent structure.

(2) Description of the Prior Art

Previous expansible trailers and trailers in general have their undercarriage (chassis), and "active," (stressed) load carrying structures under the floor and "non active," (static, compressive) "load" structures, above the floor. This conventional design utilizes inefficiently the volume of space (envelope) and the weight of construction materials consumed. Most of the trailer weight and stresses are carried by under floor framework, (frame-rails) that rest above springs, axles, wheels, etc. which consume space while raising floor level. Above floor structures are mostly compressive "load" in nature and add little to strength or sharing of stresses overall. Attempts to lower floor heights lead engineers to use inefficient multiple tandem axles with small diameter wheels and narrow cross section frame-rails (which allows bowing of said rails) yet still result in lost usable space (volume), high floor levels, and limited ceiling heights. This design "culture" also limits floor access to wheel chairs, loading, and general use (convenience). Previous expansible trailers also use internal walls and load bearing structures, which interfere with free and open spans. Another practice, accordion like floors and roofs, are bulky, clumsy, and require complex sealing and fastening means. Previous expansible trailers are leak prone, more likely to be blown over by wind due to height, awkward in appearance, and cannot lower the floor surface to a readily accessible one hundred twenty millimeters above the road surface when parked.

SUMMARY OF THE INVENTION

Objects and advantages: an object of this invention is to provide an expansible trailer with a plurality of adaptive configurations while using efficiently, through engineering, all of the cubic volume (envelope) and weight of materials consumed to serve the trailers uses and occupants to the highest practicable level in a more spacious, more accessible, stronger, better riding, maneuvering, tracking, and handling unit.

An object of this invention is to provide a pair of very similar, square and rectangular tube, box-shell, truss structures, each having a long, "primary face," outer truss wall, with a tubular torsional perimeter frame, and a long, "inner face," open span ("picture frame") wall, with an I-beam overhead, which, by their shared-stress design, eliminate conventional "undercarriage," offer exceptional comparative strength to weight, esthetic form, protection, torsional stiffness, cohesive integrity, geometric accuracy, and parallelism, while allowing a floor as thin as one hundred twenty millimeters with no structures below the one hundred twenty millimeter floor thickness, and offering increased practical ceiling height and a superior single parting line.

An object of this invention is to provide for the lateral telescoping of said box-shells, by way of a full extending, overhead, "drawer-slide" apparatus on end walls, (overhead for safety, structural finesse, and to allow a low back door threshold with the thin floor), a centerline weather seal that also acts as a cushioning travel stop during extension which consists of twin captive foam seals, compressed between twin interlocking I-beam flanges, said flanges held straight and true by the truss roof structures and parallel by a full length rotating "timing" shaft, and conventional parallel travel "anti-racking" extension-retraction apparatus (chain, racks or lead screws).

An object of this invention is to provide a simple, multiple section, fold-down to use, fold-up to travel, laminated, light weight, insulated floor, serving the "slide over" telescoping box-shell, with the foldable floor in front of the main entry door folding "up" against the front outer (movable) wall for storage between both front walls when said movable section is in the "closed" (retracted) condition so that the door is free of obstruction in said condition and that the rest of the folding floor is stored flat against the long, "inner face," open span ("picture frame") overhead I-beam wall of the primary (dominant) truss shell structure, when trailer is in the retracted (travel) condition.

An object of this invention is to provide an elevating (vertically extending and retracting) "hydraulic over air" suspension that is out of the way (against walls and overhead) uses minimum floor space, with clear open-space between the wheels, (no axle) has superior "ride," (large diameter wheels, air springs) lower scrub, push, and rolling friction, plus better "tracking," (two large single wheels that "toe-steer" into turns by way of a "scissor-link" lateral control, plus overhead "bridge" camber, caster, and anti-sway bar control)and said suspension is accessed from inside the trailer with no external access, for anti-theft provision.

An object of this invention is to provide a narrower triangular front hitch, for tighter turnabouts, that unpinned on one side, folds into itself "book-like," swings around to rest essentially parallel and nearly flat against the street side of the trailer for shorter trailer length during storage, and for improved appearance or clearance while stationary, that working in conjunction with said rear suspension, aids the trailer in raising and lowering "in the fashion of a camel," (by way of a vertical telescoping "goose neck" $5^{th}$ wheel hitch) and that can remain "hooked-up" to the towing vehicle during raising and lowering or sliding (extension and retraction) of movable box-shell.

The preferred embodiment of this invention is a fully interfaced-interlocked single entity structure in which all components are attached to each other in a single adaptive configuration unit. This is my preferred practical application (best mode).

An object of this invention is to provide a transformation configuration whereby said box-shells unhook from the interlocked expanded configuration and "stand alone," positioned relatively as before, but separated by a gap of less than one trailer length and said gap is filled with additional roof, floor, walls, etc. (such as a kit that could be carried on board) using the box-shells as primary support structures at each end of this now larger perhaps more permanent structure with a large open span and a potential floor space double that of the previously interlocked and expanded unit. These self-supporting truss shell structures may then meet or exceed "National Uniform Building Code" standards.

The composite combination of the above elements allows a structure of complimentary stressed components offering exceptional functioning space, strength, and protection, low floor and higher ceiling. These and other objects and advantages will become apparent from the following description when taken with the accompanying drawings. The drawings are for purposes of illustration and are not to be construed as defining the scope or limits of the invention, reference being had for the latter purpose to the appended claims.

DESCRIPTION OF FIGS. 1–9

Figure 1:
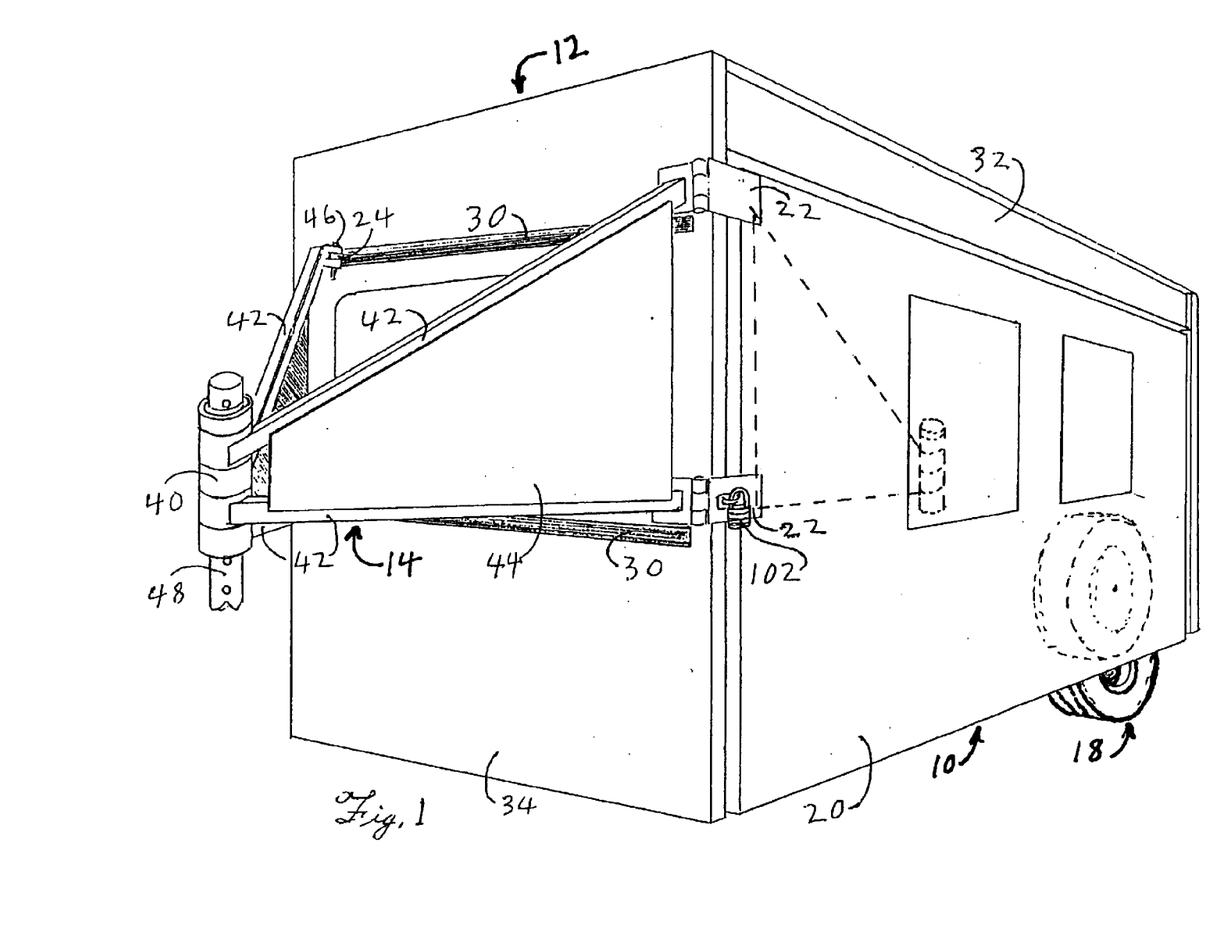
FIG. 1 is a perspective view of my novel drop-down, expansible trailer in the fully telescoped (unexpanded) mode, showing adjustable wheel positions.
Figure 2:
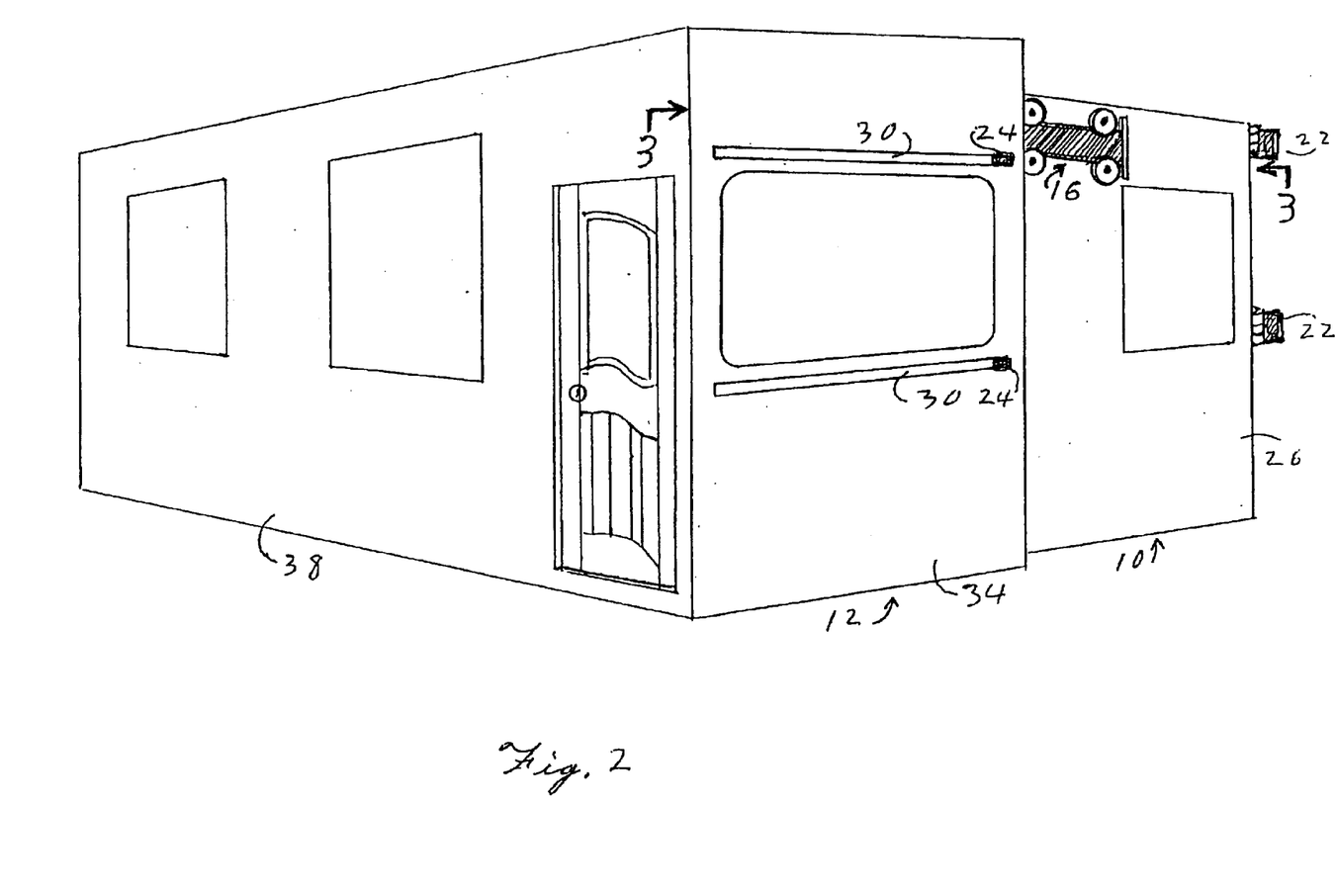
FIG. 2 is a right front view of the trailer in the fully extended (expanded) and lowered (wheels retracted) "set-up" mode.
Figure 3:
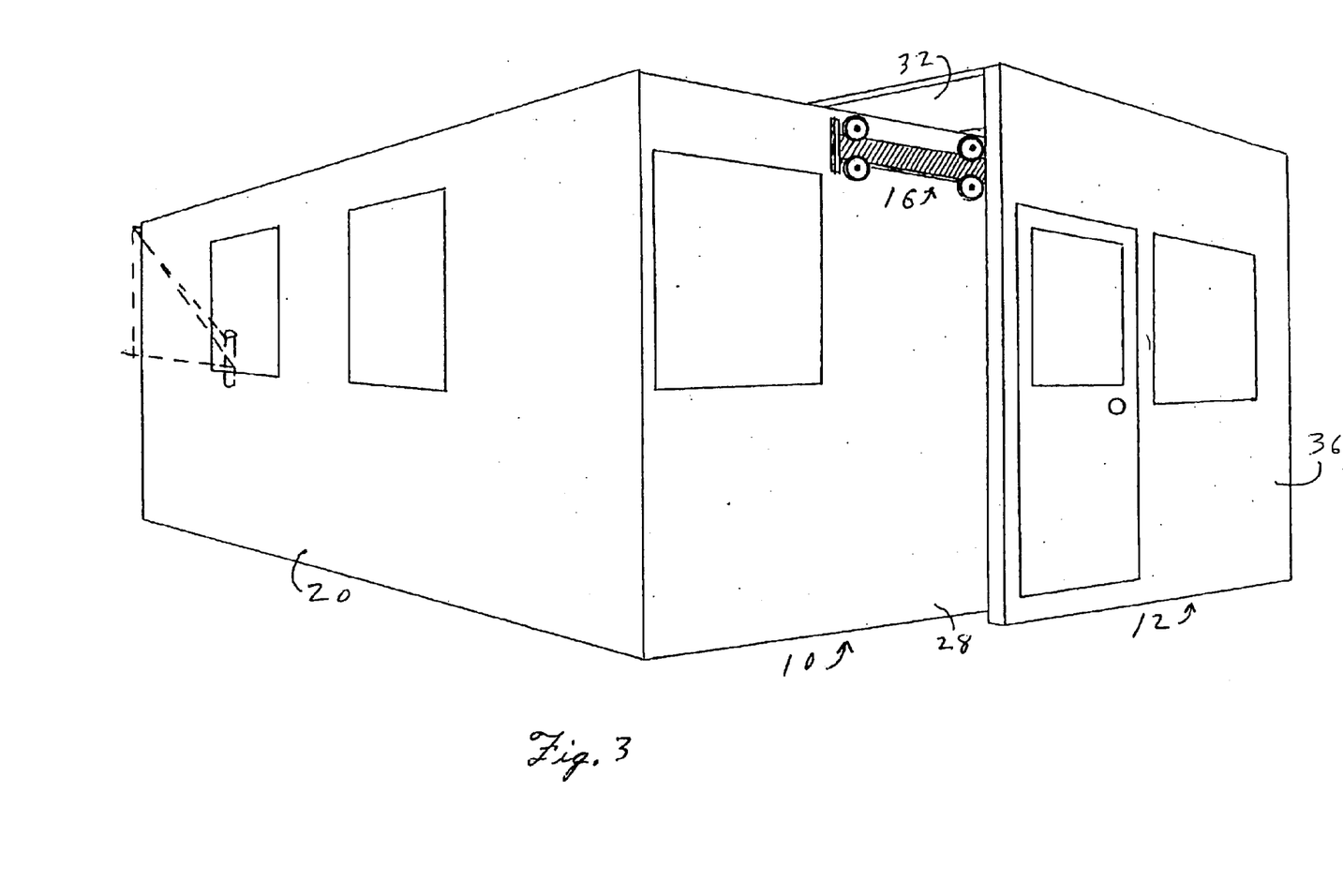
FIG. 3 is a left rear view in the as FIG. 2 mode.

FIGS. 1, 2 and 3 show the essential shape, configuration, and general location of all the major elements of this trailer. Referring to the drawings in detail and particularly FIGS. 1–2 and 3, reference characters 10, and 12, generally designate primary 10, (dominant), and secondary 12, (sliding or movable) box shells that are the principal shaping elements of a trailer constructed in accordance with this invention. A folding "fifth wheel" hitch 14, an extending-retracting "drawer slide" apparatus 16, and a multifunctional extending and retracting suspension 18, are also visibly located in FIGS. 1,2, or 3. The physical proportions of the primary (stationary during "set-up" mode) box shell 10, are essentially comparable to conventional "travel" trailers while the secondary box shell 12, is slightly larger in all dimensions than the primary box shell 10. FIG. 1 depicts the single side wall 20, the 220 degree hitch hinges 22, and the upper hitch pin lug 24, of the primary box shell 10, FIGS. 2 and 3 show the primary box shell front wall 26, and rear wall 28, in the "set-up" mode with the "fifth wheel" hitch hinges 22 shown as with the hitch folded into itself (book-like) and rotated around on the hinge axis to a position along side and essentially parallel to the single side wall of the primary box shell. Also, shown in FIGS. 1 and 2 are hitch pin lug slots 30, which are used for the purpose of allowing the secondary box shell to extend and retract without disturbing the hitch position such as folding and swinging alongside or unhooking from the towing vehicle. Said slots 30, are filled with suitable long thin insulating trim plugs or covered by spring loaded flaps (neither shown) during non-operation. FIGS. 1–2 and 3 also show the secondary box shell front wall 34, rear wall 36, single side wall 38, and full open span wall overhead I-beam 32. "Fifth wheel" hitch 14, FIG. 1 has a rotating joint 40, tubular struts 42, shear plates 44, clevis pins 46, and telescoping elevation tube 48. Said tube may be adjusted by conventional means.

Figure 4:
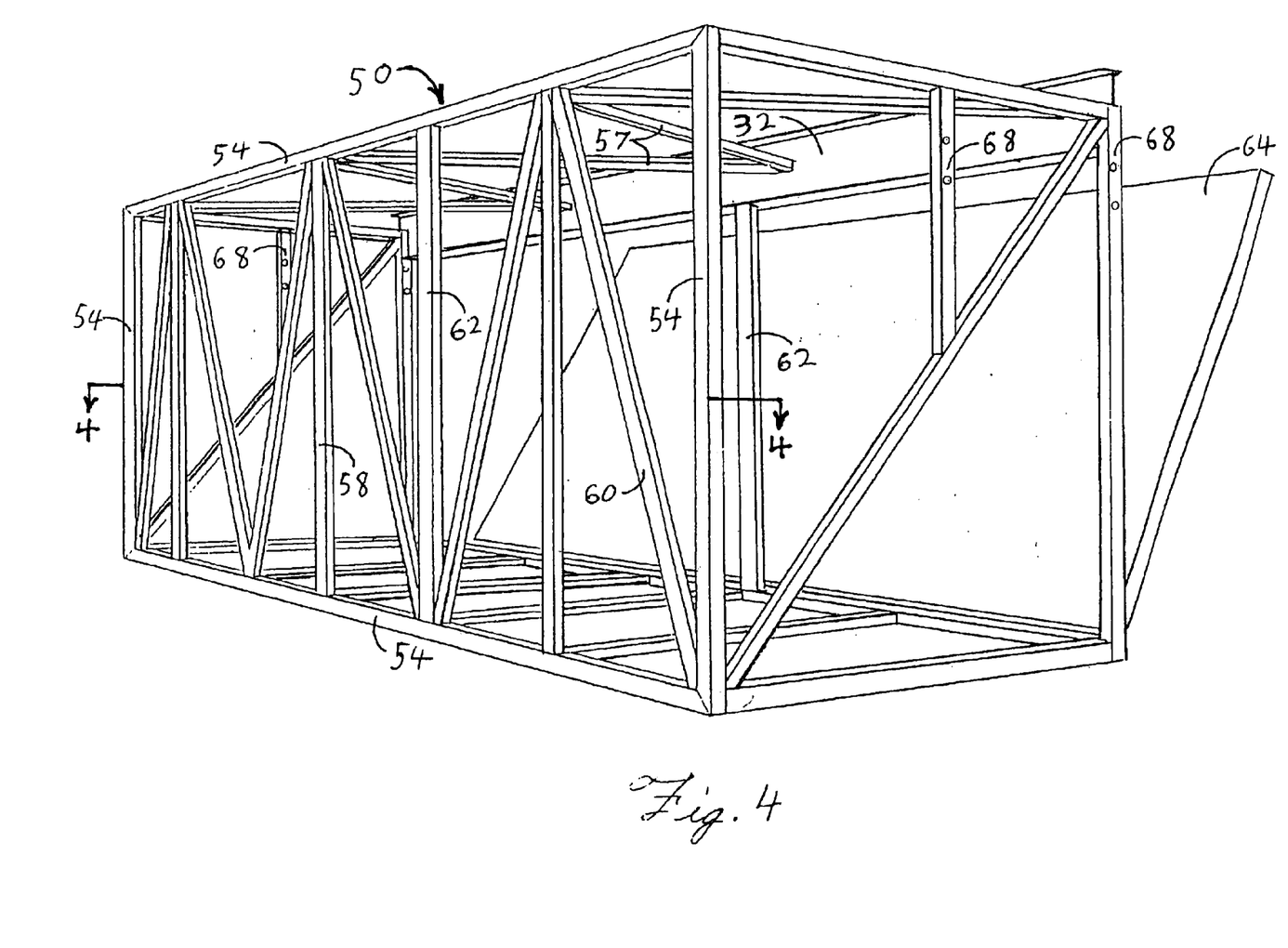
FIG. 4 is an isometric drawing of the primary (dominant) "beam span torsional truss-shell" structure of the trailer.
Figure 5:
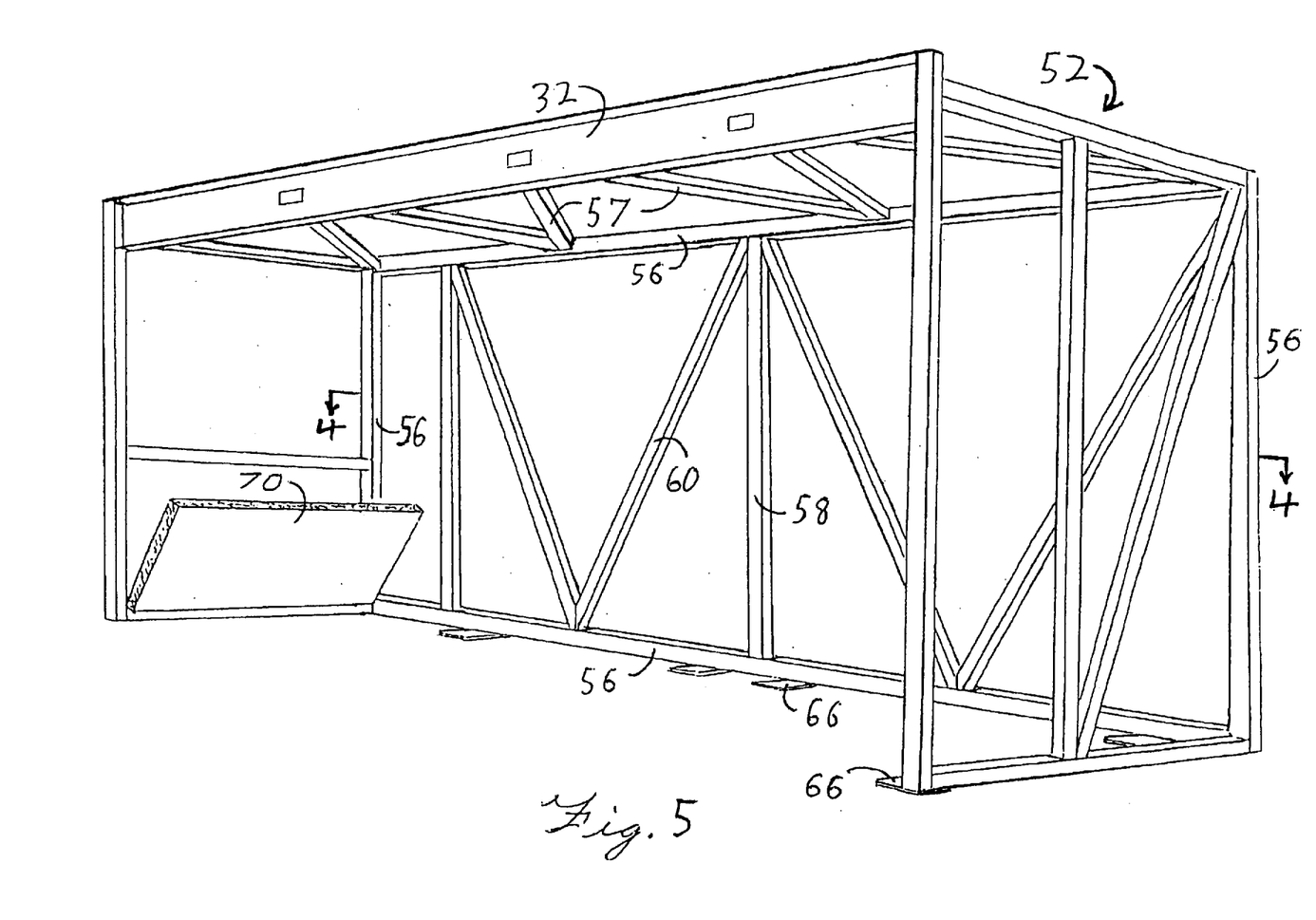
FIG. 5 is an isometric drawing of the secondary (sliding) said truss-shell structure.

FIGS. 4 and 5 represent remarkably similar primary 50, and secondary 52, principal framework structures that frame the "envelope" and support attaching appendages of this invention. Both structures primary features are the tubular "perimeter torsional frame truss" outer side walls, the "foundation" for each unit, (taken along lines 4—4 of FIGS. 4 and 5) the open span overhead I-beam 32, opposing side walls (4-4), and the anti-twist, straight and true I-beams 32, geometrically stabilized by roof trusses 57. The tubular perimeter torsional frames 54, and 56, gain further truss strength characteristics by way of vertical and angled 58, and 60, tubular members which also aid geometric accuracy and parallelism of said structures. These "stressed" torsional truss walls (4-4) aid stiffness, while handling loads including floor, roof, suspension, end walls and folding hitch. Of special interest on the primary truss shell structure FIG. 4 are the suspension attachment posts 62, and insulating lightweight laminated composite floor 64, which swings down onto perimeter ledges 66, of the secondary truss-shell in the fully extended mode, FIG. 5. Also, "press-fit" welded sleeve "drawer-slide" roller attachment points 68, support full load of the traveling secondary structure. FIG. 5 furthermore shows a smaller section 70, of said floor that folds-up against the front wall of the secondary truss wall structure below the window. In the fully retracted condition this wall rests between the two front walls 26, and 34, and allows entry and exit through the front door, in said condition.

Figure 6:
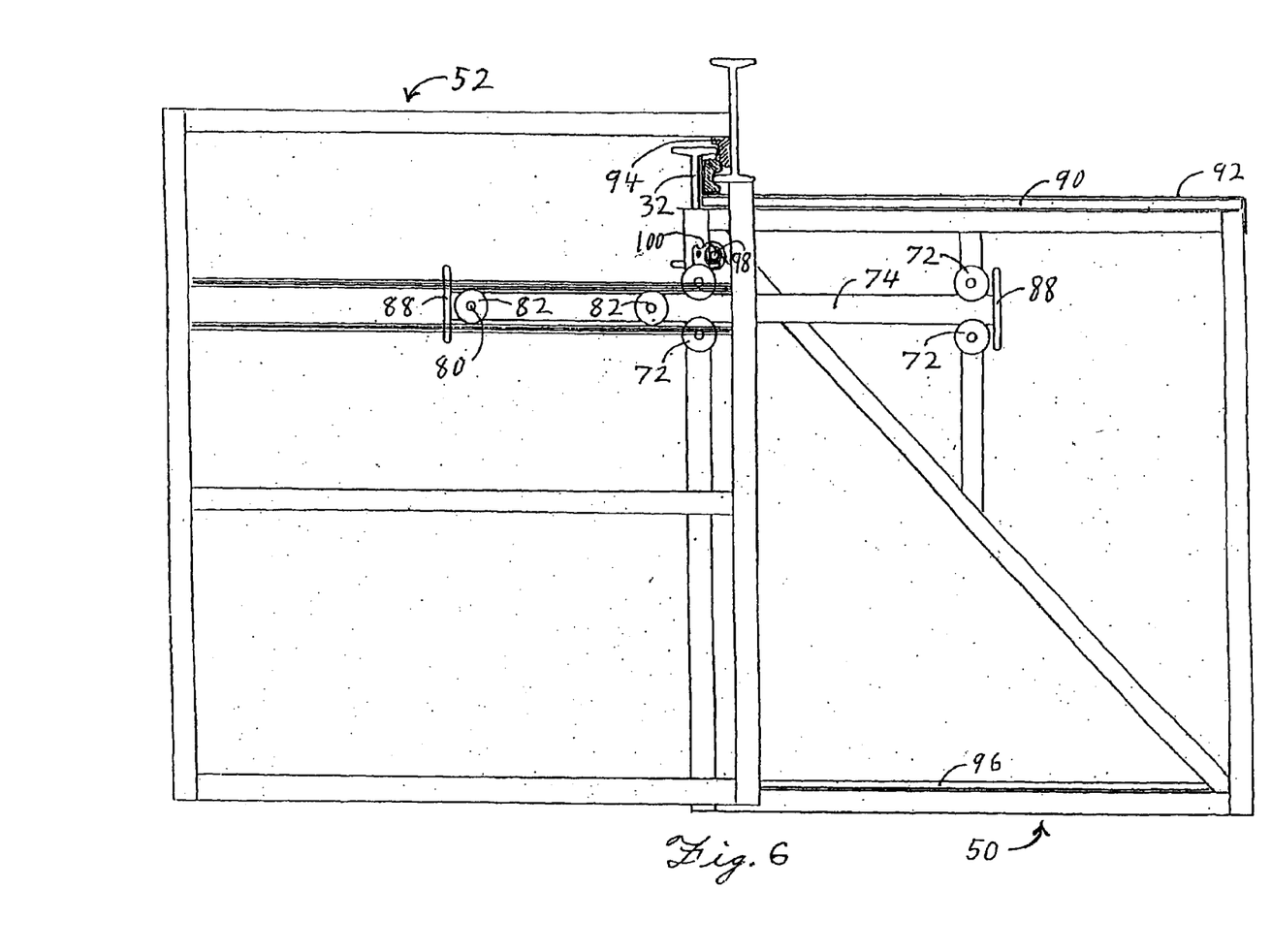
FIG. 6 is a sectional view of the two truss-shell structures interfaced and interlocked in the fully extended condition with the "twin" seals and "drawer slide" mechanisms shown, taken along lines 3—3 of FIG. 2.
Figure 7:
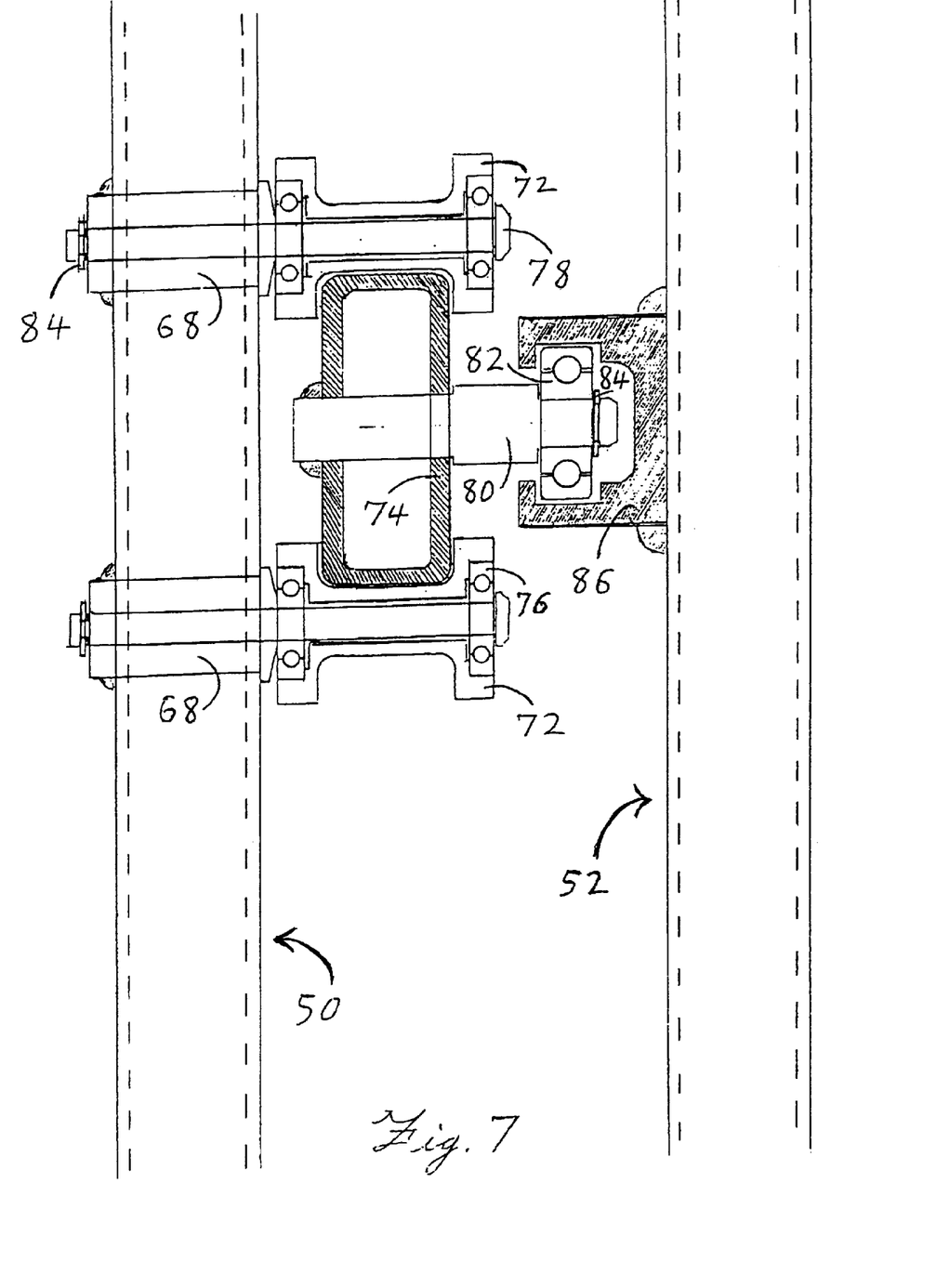
FIG. 7 is an end view detail of the "drawer slide" rollers, traveling torsional arm, and travel track of secondary truss-shell.

FIG. 6 demonstrates the interfacing of the two principal truss-shell structures 50, and 52, showing the fully extended configuration. In particular, the manner in which the "twin compressible foam seals 94, act as a cushioned travel stop, a double weather seal along the center span, and in touching each other also form a full thermal barrier from within the extended trailer to the outer I-beam 32. The dual I-beams 32, span the center distance carrying roof and floor loads (floor via suspension vertical anchor post 62) interlock in the fully extended "set-up" configuration, forming said stop and twin seals 94, and are held straight and non-twisting to aid parallelism and equal contact along the length of the sealing flange surfaces by the trusses 51, in the roofs of each truss shell(box) 50 and 52. FIG. 6 also depicts floor panels 96, roof panels 90, and vinyl-rubber roof sealing membrane 92, all of which are applicable to the primary structure only. A "drawer slide" type mechanism to enable the precise controlled extension-retraction of the secondary structure with minimum "set-up" procedures-operations is described in both FIGS. 6 and 7. Starting at roller shaft support sleeves 68, on end walls of primary structure 50, suitable shafts-axles 78, are retained by threaded nylon insert locking nuts (not shown) or suitable locking snap ring-circlips in grooves 84. Tubular torsional arm 74, travels in guide rollers 72, rotating on ball bearings 76. Travel of torsional arm is limited by stops 88. Travel load transfer pins-axles 80, carry ball bearings 82, retained by said snap ring-circlips 84, along captive groove channel-track 86, mounted to inner end walls of traveling secondary structure 52. In order to prevent "racking" and aid even contact at the seals, the two overhead I-beams 32, maintain precise parallelism during secondary structure travel by way of a timing shaft 98, rotating in pillow blocks 100, located along the length of the lower inner I-bean flange of the primary truss shell structure. Said shaft may drive and time-synchronize both moving ends by way of conventional (lead-screw, chain, rack) timing, drive, tracking, apparatus.

Figure 8:
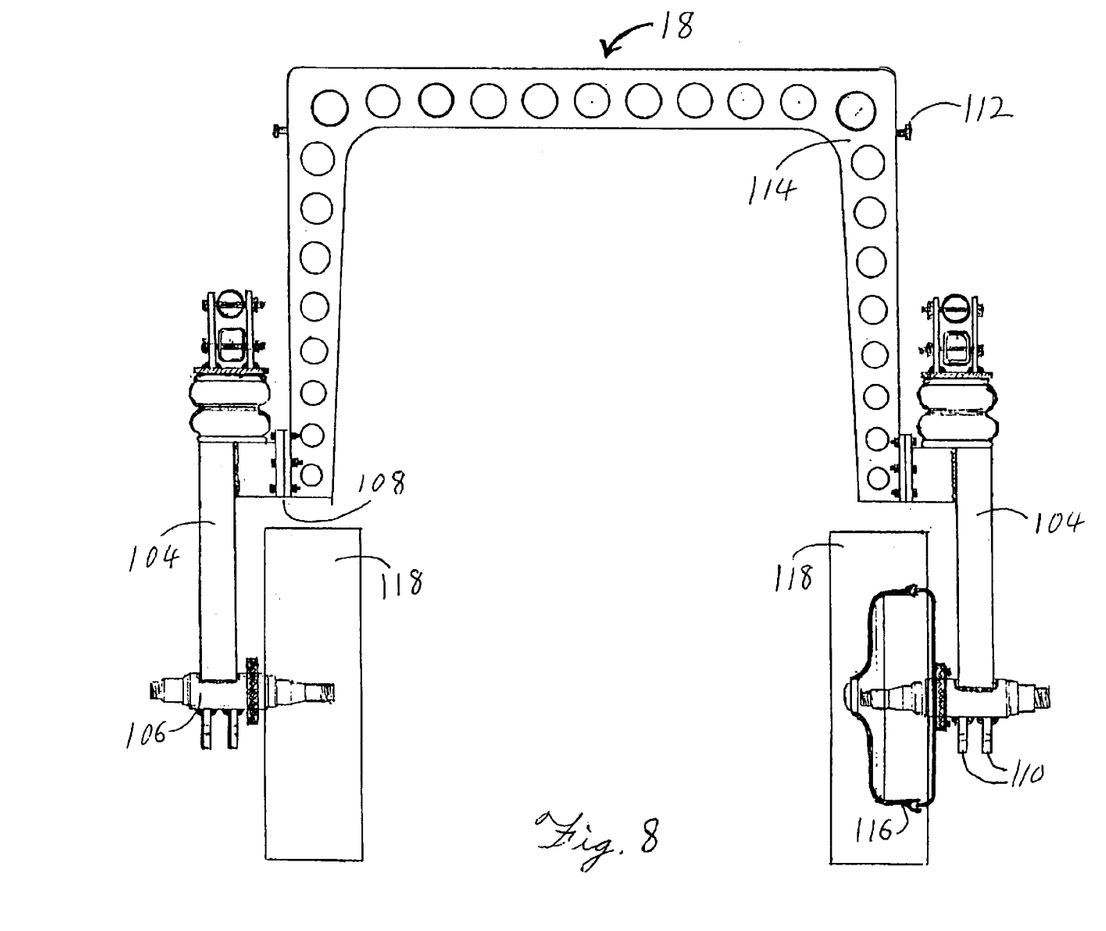
FIG. 8 is an end view of the walk thru, "overhead camber bridge," elevating suspension.

FIG. 8 clearly displays usable space gain and "walk thru" advantages of my "overhead camber bridge" suspension, generally designated by reference character 18. The actual "camber bridge" 114, carries only anti-sway bar 120, vertical-torsional loads, (by way of link 126) and strut 104, angle-locating loads, while allowing elimination of the cumbersome conventional axle system. Flange joint 108, securing bridge 114, to strut 104, allows fine camber angle and rotational "toe-in" adjustments of the primary load-bearing strut 104, by way of conventional "shims." Thus, wheels relationship to roadway plane and travel direction, are transferred from the strut 104, to the dual spindle stub axle 106, the conventionally mounted brake drum 116, then the wheel 118. Lower control arm brackets 110, and "camber bridge" anchor-pins 112, are pivoting points for (switching to FIG. 9) fore-aft locating, lower control arms 122, upper control arms 124, and anti-sway bar links 126, during vertical travel of suspension. The dynamic components ("un-sprung" weight) along with ride height-weight transfer arm 130, and parallelogram arm 132, all pivot on pins 144, in vertical suspension attachment posts 62, of truss-shell 50, and are dampened by conventional shock absorbers 132, in tab brackets 134, and 136. A conventional air bag 128, resting on strut platform 138, acts as a spring and transfers the trailer's "sprung" weight through height-load platform 140, into tangs 142, that, though parallelogram geometry, keep platforms 138 and 140, both parallel horizontally and on the same vertical axis, during raising-lowering of the trailer (extension-retraction of the wheels). Said tangs further transfer load by way of pins 144, into arm 130, post 62, and height position straps 148. A conventionally actuated hydraulic cylinder 150, raises-lowers arm 130, thereby raising-lowering trailer around suspension. Load elevating arm 130, is secured at selected level in height position straps 148, by pins 144. This suspension redistributes loads and tasks among components, locates components out of way for more usable space, and keeps wheels in locked relationship to each other and essentially perpendicular to roadway, while allowing slight negative camber and slight "toe-in" for better handling and tracking characteristics.

Figure 9:
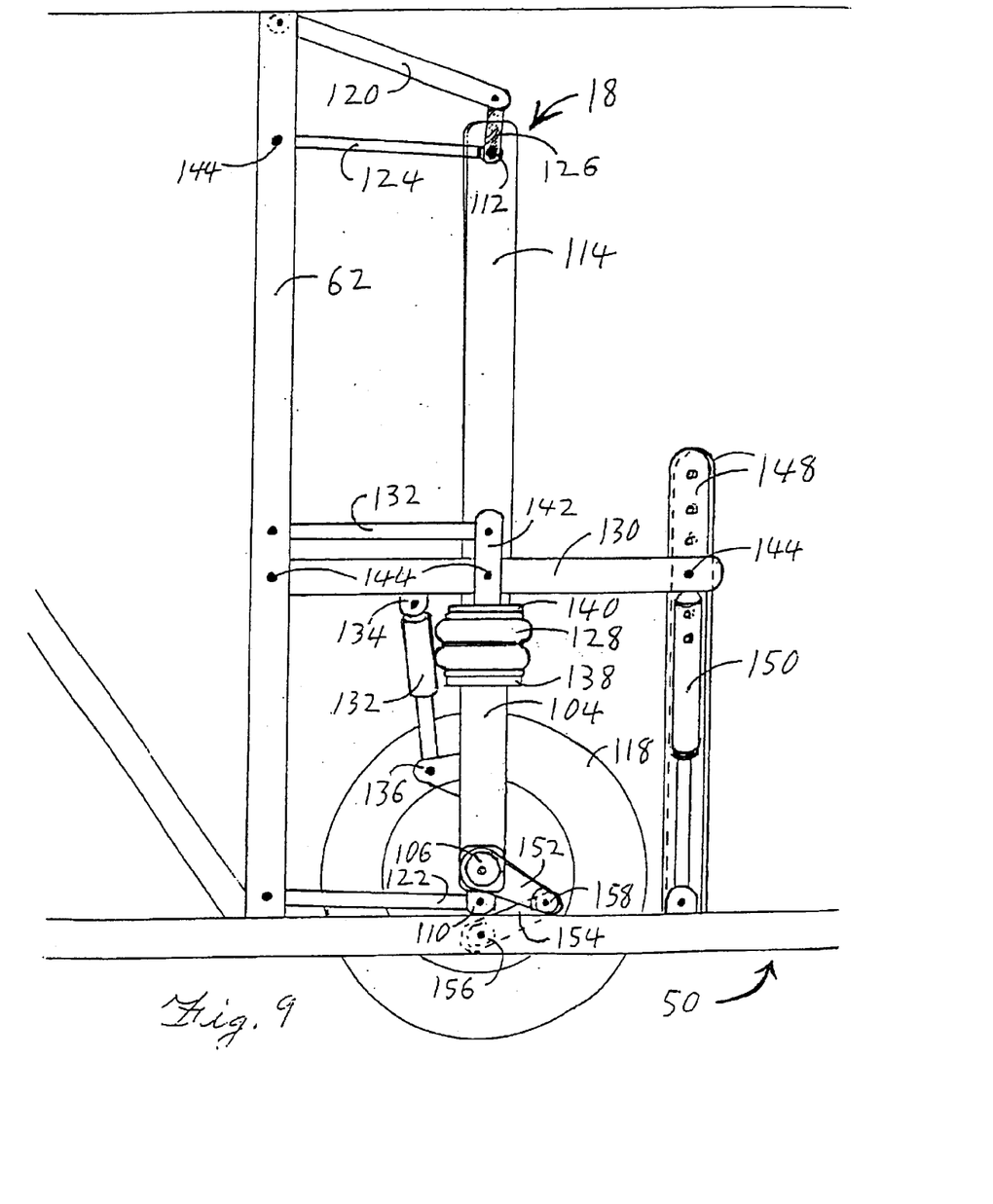
FIG. 9 is a left side view of the suspension showing various linkage, anti-sway bar and the "toe steering" lateral control link.

An important element of this invention is a lateral location mechanism that while being compact and precise, also steers (toe-steer) the wheels into the center of the road when the trailer is under centrifugal-lateral loads, as in curves, turns, etc. This scissor-like device is composed of an upper arm-link 152, attached at one end to the stub axle outer spindle 106, in the fashion of a brake drum hub and a lower-arm link 154, attached to a truss frame spindle 156. The two arms-links tie together by way of a self-aligning spherical bearing and suitable pin-shaft 158.

Wheel steering is accomplished by lateral loads pulling and pushing at said spherical connection 158, thus causing stub axle to try to twist both the strut 104, and the leg of the camber bridge 114 into the turn. Some twisting and preloading will occur. Higher lateral loads equal more twisting (steering). It is important to note that scissor link arms 152, and 154, must point to rear of trailer on both sides or an adverse effect occurs.

Operation of the Invention

Assuming the trailer is in the "hooked-up," retracted horizontally, elevated vertically, "travel" mode, trailer "set-up" is done in the fashion of a camel. On arrival the front drops, (via conventional front jacks or hydraulic activation of the telescoping elevation tube 48), then the rear (by pulling safety pin 144, in height position straps 148, and activating hydraulic cylinder 150, by conventional means), and upon departure the rear elevates first, then the front rises. Primary (dominant) box shell 10, may be leveled at the desired stationary height by conventional leveling means then by releasing the (rear view mirror observable) safety pin or padlock 102, on the left front corner of the trailer, removing slot 30, plugs and rotating the "timing" shaft 98, by conventional means (manual or power) the secondary (sliding-movable) box shell 12, may be extended to "full lock" position and the trailer essentially doubled in size. Once fully extended, the "twin" foam "weather" seals are in effect and floor sections 64, and 70 may swing down into position, said plugs replaced and the trailer is operational.

What is claimed is:

1. An expansible trailer comprising:

a primary rectangular box shell defining a living space;

a secondary rectangular box shell mounted in a telescoping manner to the primary box shell and substantially covering at least four sides of the primary rectangular box shell in a fully closed configuration;

a slide apparatus including at least two overhead tubular arms attached to the primary shell and slidably mounted to the secondary box shell between a fully open configuration and the fully closed configuration to enable the secondary box shell to be telescopingly expanded with respect to the primary box shell and thus increase the size of the living space;

a timing shaft means for preventing racking of the slide apparatus;

said primary rectangular box shell and said secondary rectangular box shell each including a torsional truss structure and a trussed I-beam extending a length of the respective box shell, said I-beams each having a foam seal, the seals interlocking in the fully open configuration;

a suspension mechanism including at least one U-shaped overhead camber bridge, at least two wheel axles attached to the overhead camber bridge with no connection between the axles, a lower space between the axles allowing for the living space to extend between them, at least one hydraulic cylinder operable to raise or lower the primary rectangular box shell and secondary box shell in relation to the wheel axles and;

a fifth wheel hitch, the hitch including a first and second set of tubular struts rotatable connected to each other, each set of struts including a triangular shaped plate, the first set of the struts being removably attached to the primary rectangular box shell by at least two removable clevis pins secured to at least two hitch pin lugs slidable in at least two slot tracks, the slot tracks being mounted parallel to each other and the slot tracks being connected to the secondary rectangular box shell, the second set of struts being pivotally attached to the primary rectangular box shell by at least two hinges, wherein the hitch can be moved between a travel mode for towing the trailer and a set up mode where the struts are folded in a collapsed position along a side of the primary rectangular box shell.

* * * * *